(12) United States Patent
Choi (10) Patent No.: US 6,999,245 B1
(45) Date of Patent: Feb. 14, 2006

(54) APPARATUS FOR DRIVING DYNAMIC APERTURE AND METHOD OF CONTROLLING THE SAME

(75) Inventor: Dong Won Choi, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/095,140

(22) Filed: Mar. 31, 2005

(30) Foreign Application Priority Data

Nov. 26, 2004 (KR) ...................... 10-2004-0098104

(51) Int. Cl.
*G02B 9/00* (2006.01)
(52) U.S. Cl. ...................... 359/738; 359/739; 359/740
(58) Field of Classification Search ................ 359/738, 359/739, 740, 820, 395; 385/115; 349/113; 353/97
See application file for complete search history.

(56) References Cited

U.S. PATENT DOCUMENTS

| 4,434,367 A | 2/1984 | Yonezawa ................... 250/311 |
| 5,537,166 A | 7/1996 | Keelan et al. ................ 353/97 |

*Primary Examiner*—Timothy Thompson
(74) *Attorney, Agent, or Firm*—Volpe and Koenig, P.C.

(57) ABSTRACT

Disclosed herein is a dynamic aperture driving apparatus for adjusting the amount of light of a projection optical system and a method of controlling the same. The system includes a rotation means, a driving means, a first detection means and a first detection means. The rotation means is connected at the upper end thereof to the dynamic aperture to be rotated to the right and left within a range of rotating angles. The driving means rotates the rotation means to the right and left according to a predetermined electric signal. The first detection means detects the position of the rotation means using a Hall effect. The second detection means detects the operational error of the first detection means due to variation in temperature.

12 Claims, 6 Drawing Sheets

PRIOR ART

FIG. 3

PRIOR ART

FIG. 4a

PRIOR ART

APPARATUS FOR DRIVING DYNAMIC APERTURE AND METHOD OF CONTROLLING THE SAME

RELATED APPLICATION

The present application is based on, and claims priority from, Korean Application Number 2004-98104, filed Nov. 26, 2004, the disclosure of which is incorporated by reference herein in its entirety.

BACKGROUND OF THE INVENTION

1. Field of the Invention

The present invention relates generally to a dynamic aperture for adjusting the amount of light of a projection lens in a projection television or projector and, more particularly, to an apparatus for driving a dynamic aperture and a method of controlling the same that can be implemented using a Hall sensor to have a simple configuration and can perform precise position control regardless of variation in ambient temperature.

2. Description of the Related Art

Recently, large screen and high definition display devices attract attention as one of important issues, representatives of which are projection televisions (TVs) and projectors.

Figure 1:
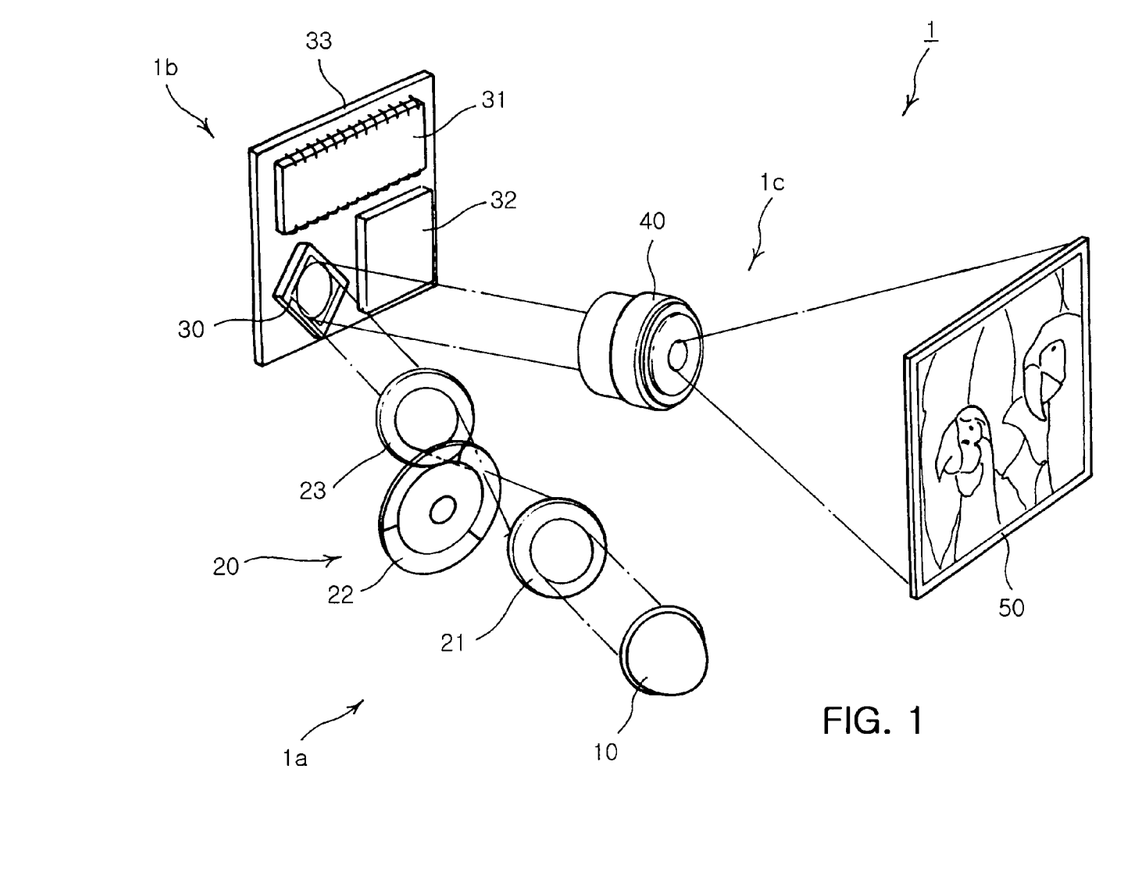
FIG. 1 is a conceptual diagram illustrating a conventional DLP™ projection apparatus.

Such projection TVs and projectors are operated according to optical principles, and FIG. 1 shows an example of the optical configuration of such a projection television or projector.

Referring to FIG. 1, a projection apparatus generally includes an illumination optical system 1a for generating light, a reflective display device 1b for imposing an image on the light incident from the illumination optical system 1a by reflecting the light on a pixel basis according to a provided image, and a projection optical system 1c for projecting the image, which is reflected through the reflective display device 1b, on a screen.

The illumination optical system 1a includes a light source 10 having a lamp for generating light and a reflecting mirror for reflecting light to guide the light along a propagation path, and an optical lens 20 for irradiating the light, which is emitted from the light source 10, onto the reflective display device 1b.

The optical lens 20 includes a condensing lens 21 for condensing light, which is emitted from the light source 10, onto the display device 1b and a shaping lens 23 for shaping the condensed light while converting the condensed light into collimated light. In this case, a color wheel 22, which is rotated in a single direction by a driving device (not shown) and has a plurality of color filters arranged along a radial direction at regular intervals, is placed between the condensing lens 21 and the shaping lens 23 to selectively transmit desired color light during the rotation thereof.

The display device 1b is implemented using a digital micromirror device (DMD) 30, which is mounted on a substrate 33 having a processor 31 and memory 32 and separates the optical path of the illumination optical system 1a and the optical path of the projection optical system 1c according to the tilt angle thereof.

The DMD 30 is a projection type display device that was developed by Texas Instruments Inc. and employs an optical semiconductor for controlling light. The DMD 30 is provided with a plurality of micro reflecting mirrors having a micro size that are two-dimensionally arranged on a silicon wafer. Each of the reflective micro mirrors handles and corresponds to a pixel structure, and the tilt of the mirror is adjusted by a corresponding electrostatic system of the memory 32, which is arranged to correspond to each pixel, thus implementing the image. Each of the reflecting mirrors of the DMD 30 reflects incident light while switching the optical path of the light between two states (ON/OFF) by the tilting movement thereof at a high speed of 10 μs.

In other words, when the reflecting mirror is tilted and switched to the ON state, the light reflected by the reflecting mirror is enlarged through the projection lens module 40 of the projection optical system 1c and is then irradiated onto a screen 50. In contrast, when the reflecting mirror is tilted and switched to the OFF state, the light incident on the reflecting mirror cannot be irradiated onto the screen 50. The DMD 30 imposes image information on light provided by the illumination optical system 1a by selectively turning on and off the light in such a way as to individually tilt the reflecting mirrors according to image signals for individual pixels and, therefore, vary the reflecting angles of the individual mirrors.

The projection optical system 1c is formed of the projection lens module 40, and focuses an image, which is transmitted from the DMD 30, on the screen 50 while enlarging the image.

Figure 2:
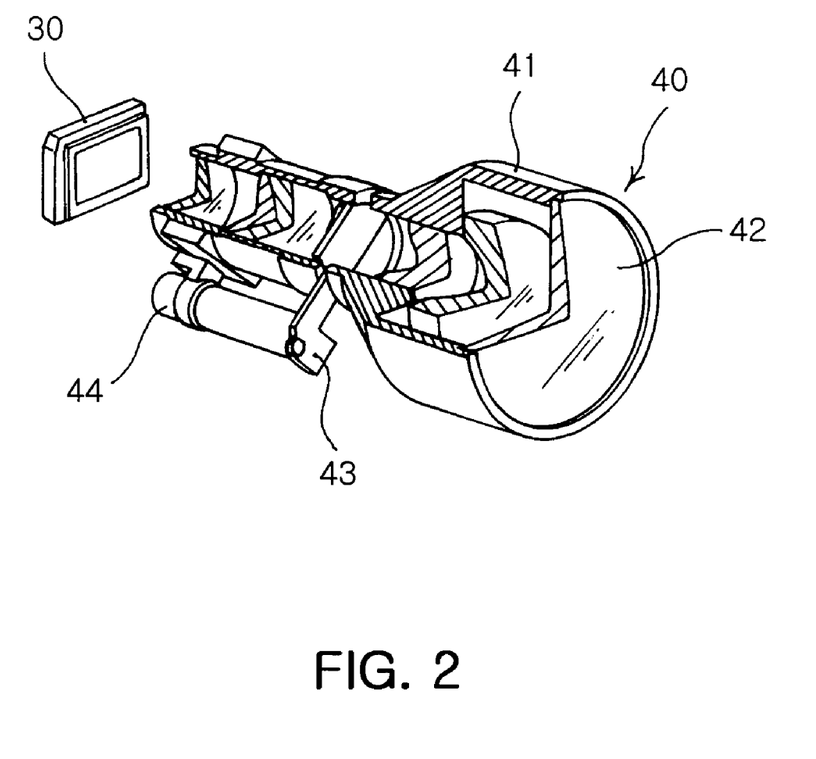
FIG. 2 is a detailed view showing the configuration of the optical engine of a projection optical system in the DLP™ projection apparatus of FIG. 1.

In this case, the projection lens module 40, as shown in FIG. 2, is formed of a plurality of projection lenses which are sequentially arranged along an optical axis in a lens barrel 41 and have predetermined individual diameters and individual optical properties so that the image incident from the DVD 30 is enlarged to be clearly focused on the screen 50 that is spaced apart therefrom by a predetermined distance. In this case, the focal distance of the projected image can be adjusted by controlling the interval between two adjacent projection lenses 42.

Furthermore, an aperture 43 is provided between the projection lenses 42 to adjust the amount of light so that a projected image has appropriate contrast. In this case, in order to precisely adjust the contrast, the position of the aperture 43 must be controlled at 128 high resolution steps within an arbitrary angle (e.g., 30 degrees), and a Voice Coil Motor (VCM) 44 is generally used to rotate the aperture 43 so as to perform precise position control.

Figure 3:
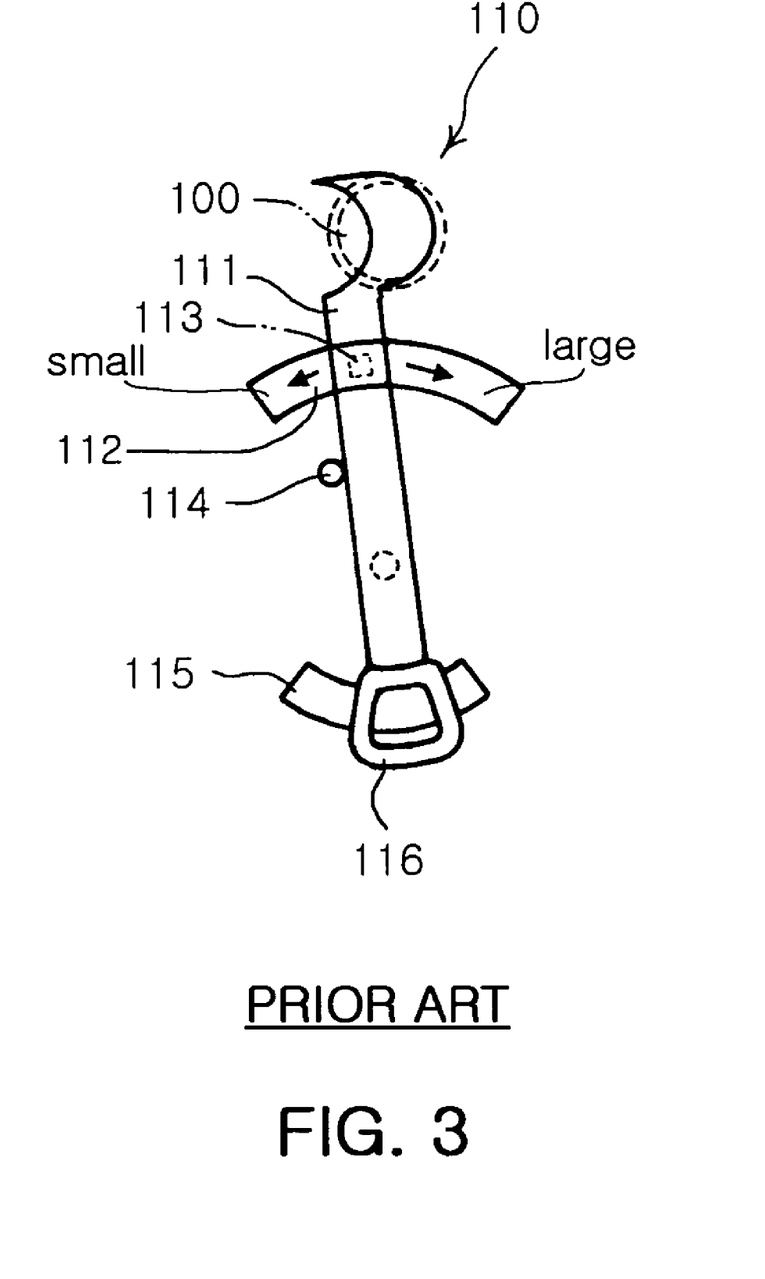
FIG. 3 is a schematic diagram showing a structure for controlling a conventional dynamic aperture.

FIG. 3 shows a conventional structure for controlling the position of an aperture. A conventional apparatus for controlling an aperture 110 includes a pivot 111 integrated with the aperture and adapted to be rotated to the right and left, a sensor magnet 112 adapted to provide different magnetic intensity according to the rotating angle of the pivot 111, a Hall sensor 113 integrally rotated along with the pivot 111 and adapted to convert the intensity of a magnetic field, which is provided by the sensor magnet 112, into an electric signal, a stopper 114 located at a limit position of the rotational range of the pivot 111 to stop the pivot 111 which tends to be rotated over the limit position, a driving magnet 115 located on the rotational path of the lower end of the pivot 111, and a driving coil 116 installed on the lower end of the pivot 111 to be opposite to the driving magnet 115 to rotate the pivot 111 according to driving current generated by electromagnetic interaction with the driving magnet 115. The driving magnet 115 and the driving coil 116 correspond to the VCM.

The aperture driving apparatus performs feedback control to cause the pivot 111 to move to a designated position in such a way as to rotate the pivot 111a by applying current to the driving coil 116 and detect the position of the pivot 111 using the sensor magnet 112 and the Hall sensor 113.

Figure 4A:
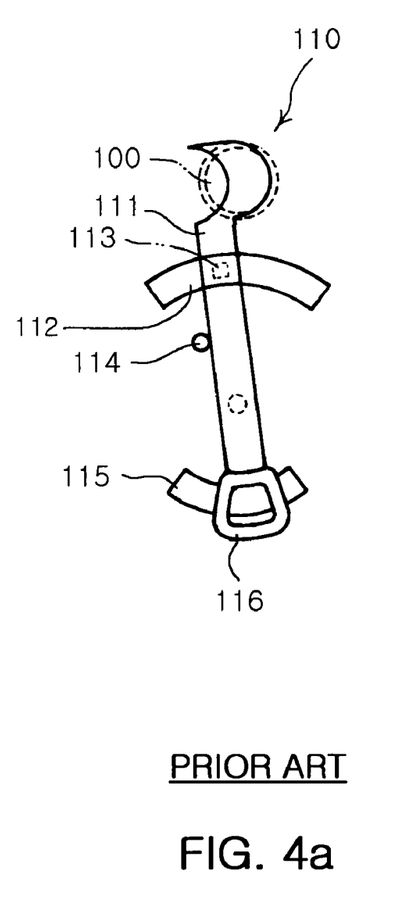
FIGS. 4a and 4b are diagrams showing the operation of the conventional dynamic aperture.
Figure 4B:
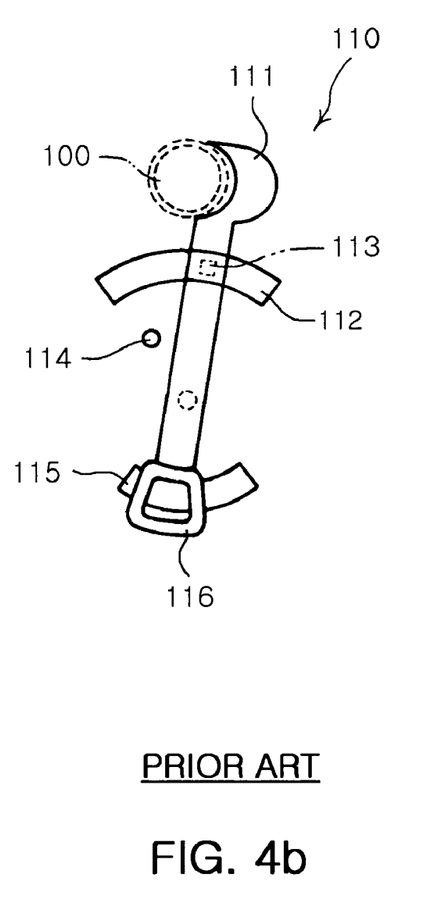

A conventional process of detecting the position of an aperture is described below. As shown in FIG. 4a, in the initial state in which current is not applied to the driving coil 115, the pivot 111 is stopped by the stopper 114 and the output of the Hall sensor 113 is then stored as a reference value. Thereafter, when the pivot 111 is rotated by a certain angle as shown in FIG. 4b, the output of the Hall sensor 113 is changed and the rotating angle of the pivot 111 is estimated from the difference between the stored reference value and the output of the Hall sensor 113.

However, when ambient temperature varies in the case where the position of the pivot 111 is detected using the Hall sensor 113 as described above, the magnetization of the sensor magnet 112 corresponding to the rotating angle of the pivot 111 is changed, so that the output of the Hall sensor 113 is changed by the ambient temperature even though the pivot 111 is located at the same position. As a result, since the position feedback value is changed depending on the ambient temperature, the reliability of the driving of the aperture is deteriorated.

Furthermore, instead of the Hall sensor, an optical sensor or MR encoder which is not subject to the influence of ambient temperature may be used to perform the position control, which results in high cost and complex circuit configuration.

SUMMARY OF THE INVENTION

Accordingly, the present invention has been made keeping in mind the above problems occurring in the prior art, and an object of the present invention is to provide an apparatus for driving a dynamic aperture and a method of controlling the same that can be implemented using a Hall sensor so as to have a simple configuration and that can perform precise position control regardless of variation in ambient temperature.

In order to accomplish the above object, the present invention provides a dynamic aperture driving apparatus for adjusting the amount of light of a projection optical system by rotating a dynamic aperture, including a rotation means connected at the upper end thereof to the dynamic aperture to be rotated to the right and left within a range of rotating angles; a driving means for rotating the rotation means to the right and left according to a predetermined electric signal; a first detection means for detecting the position of the rotation means using a Hall effect; and a second detection means for detecting the operational error of the first detection means due to variation in temperature.

In the dynamic aperture driving apparatus, the first detection means may include a sensor magnet located parallel to the rotational path of the rotation means to provide a varying intensity of magnetization depending on the rotating angle of the rotation means based on linear variation in the intensity of magnetization along the length thereof; and a first Hall sensor rotated along with the rotation means to convert the intensity of magnetism, which is provided by the sensor magnet, into an electric signal. Alternatively, the first detection means may include a sensor magnet secured at a predetermined position so that the interval between the rotation means and the sensor magnet can be changed by the rotation of the rotation means and adapted to have a constant intensity of magnetization; and a first Hall sensor rotated along with the rotation means to convert the intensity of magnetism of the sensor magnet, which changes depending on the rotating angle, into an electric signal.

In the dynamic aperture driving apparatus, the second detection means may be formed of a second Hall sensor that is fixed at a position spaced apart from the sensor magnet by a predetermined distance to detect variation in the intensity of magnetization of the sensor magnet.

The dynamic aperture driving apparatus may further include a temperature compensation means for calculating variation in the characteristic of the first detection means due to variation in temperature from variation in the output of the second detection means and outputting a temperature compensation value for compensating for a position detection error of the first detection means; and a driving control means for compensating for the position detection error of the first detection means using the temperature compensation value, receiving an indicated position value, comparing the indicated position value with the corrected position detection value and controlling the driving means to cause the rotation means to reach an indicated position.

Additionally, In order to accomplish the above object, the present invention provides a method of controlling a dynamic aperture driving apparatus for detecting a rotational position using a sensor magnet adapted to provide a varying intensity of magnetism depending on a rotating angle of a rotation means connected to a dynamic aperture, a first Hall sensor placed on the rotation means to convert the intensity of magnetism into an electric signal, and a second Hall sensor secured at a location spaced apart from the sensor magnet by a predetermined distance to detect variation in a magnetic force of the sensor magnet, the control method including the steps of storing the output of the second Hall sensor at a predetermined temperature before the dynamic aperture is driven, as a reference value; receiving an indicated position value of the rotation means; detecting the current position of the rotation means through the first Hall sensor; calculating a temperature compensation value corresponding a deviation by comparing the output of the second Hall sensor with the reference value; calculating a temperature-compensated position detection value by compensating for the position detection value, which is detected through the first Hall sensor, using the temperature compensation value; and comparing the temperature-compensated position with the indicated position value and moving the rotation means to cause the dynamic aperture to reach the indicated position.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The present invention provides an apparatus for driving the position of a dynamic aperture using the Hall effect, in which the characteristic change of a sensor magnet depending on variation in temperature is detected, so that an error in the detection of a position is compensated for using the characteristic change, thus being capable of precisely controlling the dynamic aperture.

Figure 5A:
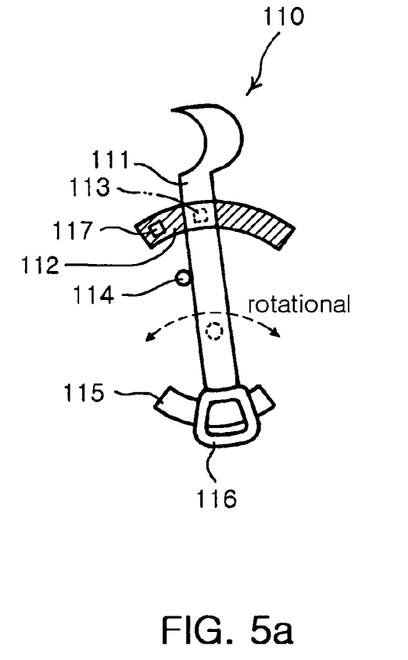
FIG. 5a is a first embodiment of a dynamic aperture driving apparatus in accordance with the present invention.
Figure 5B:
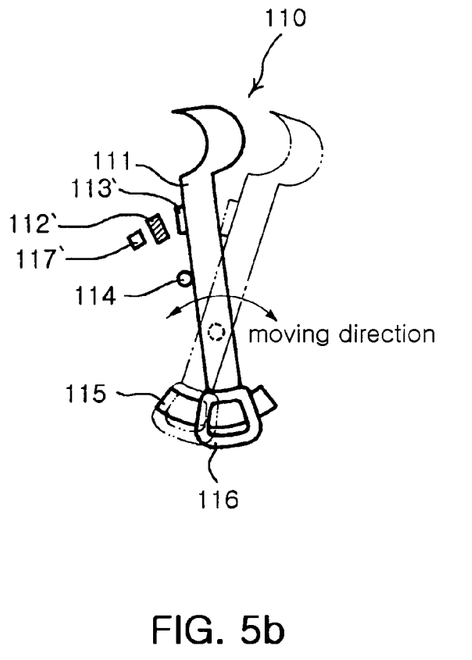
FIG. 5b is a second embodiment of a dynamic aperture driving apparatus in accordance with the present invention.

FIGS. 5a and 5b show embodiments of the dynamic aperture driving apparatus improved in accordance with the present invention.

Referring to FIG. 5a, the dynamic aperture driving apparatus of the present invention includes a pivot 111 integrated at the upper end thereof with an aperture within the projection lens module 40 of the projection optical system 1c to be rotated to the right and left within a predetermined range of rotating angles, a sensor magnet 112 located at a position spaced apart from the pivot 111 by a predetermined distance to allow the length of the sensor magnet 112 to be parallel to the rotational path of the pivot 111 so as to provide a magnetic force having intensity depending on a rotating angle due to the linear change in the magnetization of the sensor magnet 112 depending on the length direction thereof, a first Hall sensor 113 rotated along with the pivot 111 to convert the intensity of magnetization, which changes depending on the position of the pivot 111 and is provided by the sensor magnet 112, into an electric signal, a driving magnet 115 located along the rotating path of the lower end of the pivot 111, a driving coil 116 located at the lower end of the pivot 111 to be rotated to the right and left along the driving magnet 115 due to an electromagnetic force which is generated by the application of the driving current to the driving coil 116, and a second Hall sensor 117 secured at a position spaced apart from the sensor magnet 112 by a predetermined distance to convert the intensity of the magnetization, which is generated from the sensor magnet 112, into an electric signal.

In the above-described configuration, the pivot 111 is a rotating means that is integrated with the aperture to be rotated to the right and left within a predetermined range of rotating angles, and the driving magnet 115 and the driving coil 116 are driving means that rotate the pivot 111 in a VCM manner.

The sensor magnet 112 and the first Hall sensor 113 correspond to a first detection means for detecting the rotating angle of the rotating means, and the second Hall sensor 117 corresponds to a second detection means for detecting the characteristic change of the first detection means depending on variation in temperature.

The position detection and the temperature compensation in the dynamic aperture driving apparatus constructed as described above are described below.

Since the intensity of the magnetization of the sensor magnet 112 along the lengthwise direction thereof is linearly changed, the sensor magnet 112 generates a magnetic force having varying intensity depending on the rotating angle of the pivot 111. In this case, the first Hall sensor 113 converts the intensity of magnetism, which is generated by the sensor magnet 112, into a current signal while being rotated along with the pivot 111. Since the current generated by the first Hall sensor 113 is changed depending on the intensity of magnetism, which is provided from the sensor magnet 112, due to the Hall effect, a current signal output from the first Hall sensor 113 corresponds to the rotating angle of the pivot 111 and the rotating angle of the pivot 111 corresponds to the position of the aperture, so that the output current of the first Hall sensor 113 represents the position of the aperture. Accordingly, the output current of the first Hall sensor 113 is used as the position value of the aperture.

In the meantime, the intensity of magnetization of the sensor magnet 112, which functions as the reference of the output current of the first Hall sensor 113, may be changed depending on the ambient temperature as described above.

The position of the second Hall sensor 117 is fixed with respect to the sensor magnet 112. Accordingly, when the characteristic of the sensor magnet 112 is not changed, i.e., when the ambient temperature is not changed, the output of the second Hall sensor 117 is not changed. In contrast, when the characteristic of the sensor magnet 112 is changed, i.e., when the ambient temperature is changed, the output of the second Hall sensor 117 is changed. As a result, by checking the output of the second Hall sensor 117, it can be determined whether the characteristic of the sensor magnet 112 is changed and to what degree the characteristic of the sensor magnet 112 is changed.

Referring to FIG. 5b, there is shown another embodiment of the dynamic aperture driving apparatus of the present invention, which is slightly different from that of FIG. 5a in a position detection principle.

Referring to FIG. 5b, the dynamic aperture driving apparatus according to the second embodiment of the present invention includes a pivot 111 integrated at the upper end thereof with an aperture within the projection lens module 40 of the projection optical system 1c to be rotated to the right and left within a predetermined range of rotating angles, a sensor magnet 112' fixed at a predetermined position so that the distance therefrom to the pivot 111 is changed by the rotation of the pivot 111 and adapted to have a constant intensity of magnetization, a first Hall sensor 113' rotated along with the pivot 111 to convert the intensity of magnetization, which changes depending on the rotational position of the pivot 111 and is provided by the sensor magnet 112', into an electric signal, a driving magnet 115 located along the rotating path of the lower end of the pivot 111, a driving coil 116 located at the lower end of the pivot 111 to be rotated to the right and left along the length of the driving magnet 115 due to an electromagnetic force which is generated by applying driving current to the driving coil 116, and a second Hall sensor 117 secured at a position spaced apart from the sensor magnet 112' by a predetermined distance to convert the intensity of magnetization, which is generated by the sensor magnet 112, into an electric signal.

In the same manner as described above, in the above configuration, the pivot 111 corresponds to a rotating means that is integrated with the aperture to be rotated to the right and left within a predetermined range of rotating angles, and the driving magnet 115 and the driving coil 116 correspond to a driving means that rotates the pivot 111 in a VCM manner. The sensor magnet 112'and the first Hall ' sensor 113' correspond to a first detection means for detecting the rotating angle of the rotating means, and the second Hall sensor 117' corresponds to a second detection means for detecting the characteristic change of the first detection means depending on variation in temperature.

The position detection and the temperature compensation in the dynamic aperture driving apparatus of the second embodiment of the present invention are described below.

The magnetization of the sensor magnet 112' has a constant intensity. Accordingly, the intensity of magnetism provided by the sensor magnet 112' is inversely proportional to the distance to the sensor magnet 112'. Furthermore, the distance from the pivot 111 to the sensor magnet 112' changes depending on a rotating angle while the pivot 111 is rotated within a predetermined range of angles. Accordingly, the current output from the first Hall sensor 113', which is rotated along with the pivot 111, changes depending on the rotating angle of the pivot 111, so that the rotating angle of the pivot 111, i.e., the position of the aperture, can be detected based on the output current of the first Hall sensor 113'.

In this case, it is preferred that variation in the distance from the sensor magnet 112' to the pivot 111, i.e., variation in the intensity of magnetism in the pivot 111, is linearly changed depending on the rotating angle of the pivot 111. At this time, the output current of the first Hall sensor 113' can be easily processed.

Since the second Hall sensor 117' is secured and, therefore, the distance between the second Hall sensor 117' and the sensor magnet 112' is constant, a constant amount of current is output as long as the characteristic of the sensor magnet 112' is not changed. In contrast, when the magnetization of the sensor magnet 112' is changed due to the change in the ambient temperature, the output of the second Hall sensor 117', which converts the corresponding intensity of magnetism into its electric signal, is changed. Accordingly, by checking variation in the output of the second Hall sensor 117' during the driving of the aperture with respect to the output of the second Hall sensor 117' at a predetermined reference temperature, it can be determined whether the characteristic of the sensor magnet 112' has been change depending on the temperature and to what degree the characteristic of the sensor magnet 112 has changed.

The position control of the dynamic aperture using the dynamic aperture driving apparatus constructed as shown in FIGS. 5a and 5b may be implemented as described below.

In order to determine whether the characteristic of the sensor magnet 112 and 112' has changed and to what degree the characteristic thereof has changed, the output value of the second Hall sensor 117 and 117' at a predetermined reference temperature is stored as a reference value before the dynamic aperture starts to operate.

When the dynamic aperture starts to operate and the indicated position value of the pivot 111 is provided, position control starts to rotate the pivot 111 to an indicated position. It is determined whether the characteristics of the sensor magnet 112 and 112' have changed by comparing the predetermined reference value with the detection value of the second Hall sensor 117 and 117' that is detected at the time when the indicated position value is input.

If there is no deviation between the stored reference value and the current output value of the second Hall sensor 117 and 117', the characteristic of the sensor magnet 112 and 112' has not changed, so that the output of the first hall sensor 113 and 113' may be used without position compensation. In contrast, if there is a deviation between the reference value and the current output value of the second Hall sensor 117 and 117', the characteristic of the sensor magnet 112 and 112' has changed due to variation in temperature, so that the position detection value of the first Hall sensor 113 must be compensated for according to the degree of variation in the characteristic and the compensated position value must be used to drive the pivot 111. In other words, compensation for the current position value of the first Hall sensor 113 and 113' is performed using the deviation between the reference and the current position detection value of the second Hall sensor 117 and 117', the temperature-compensated position detection value is compared with the indicated position value, and then the amount of current of the driving coil 116 is adjusted to cause the pivot 111 to reach the indicated position.

Figure 6:
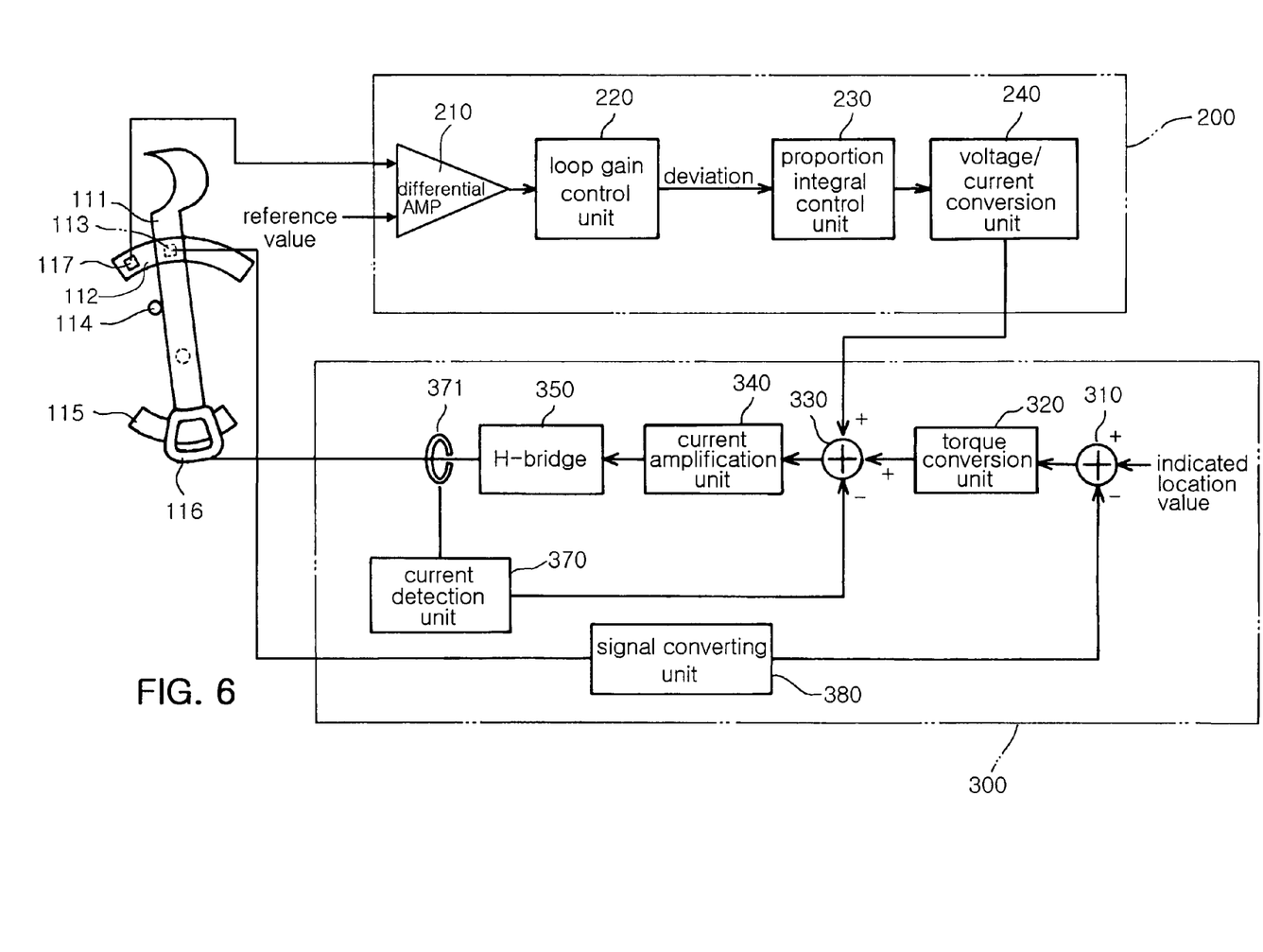
FIG. 6 is a block diagram for illustrating an exemplary application of the dynamic aperture driving apparatus in accordance with the present invention.

FIG. 6 is a block diagram showing the dynamic aperture driving apparatus of the present invention that further includes a means for performing position control described above. FIG. 6 shows only the first embodiment shown in FIG. 5a, but may be similarly applied to the second embodiment shown in FIG. 5b.

Referring to FIG. 6, the dynamic aperture driving apparatus of the present invention further includes a temperature compensation means 200 for calculating variation in the characteristic of the sensor magnet 112 due to variation in temperature by comparing the predetermined reference value with the detection value of the second Hall sensor 7 and outputting the variation in the characteristic as a temperature compensation value, and a driving control means 300 for receiving the indicated position value, comparing the indicated position value with the detection value of the first Hall sensor 113, and controlling the current of the driving coil 116 to cause the pivot 111 to reach the indicated position.

In detail, the temperature compensation means 200 includes a differential amplification unit 210 for comparing the predetermined reference value with the output of the second Hall sensor 117 and amplifying the deviation therebetween, a loop gain control unit 220 for controlling the gain of the output of the differential amplification unit 210, a proportional integral control unit 230 for calculating a temperature compensation value by performing a proportional integral control on a deviation value output through the loop gain control unit 220, and a voltage/current conversion unit 240 for converting a temperature compensation value, which is output from the proportional integral control unit 230, into a current signal.

The driving control unit 300 includes a signal conversion unit 380 for converting the output of the first Hall sensor 113 into a voltage signal, a first operation unit 310 for outputting a deviation by comparing the indicated position value, which is transmitted in the form of a predetermined voltage signal, with the position detection value of the signal conversion unit 380, a torque conversion unit 320 for converting the deviation, which is output from the first operation unit 310, into a torque value by which the pivot 111 is rotated, a second operation unit 330 for adding the temperature compensation value of the temperature compensation means 200 to the output of the torque conversion unit 320 and then subtracting a current feedback from the result of the addition, a current amplification unit 340 for amplifying the output of the second operation unit 330, a H-bridge 350 for rectifying the output signal of the current amplification unit 340 and applying a rectified output signal to the driving coil 116, and a current detection unit 370 for feeding back the current, which is applied to the driving coil 116, to the second operation unit 330.

The driving control means 300 adjusts the amount of current of the driving coil 116 by adding up the temperature compensation value that is provided by the temperature compensation unit 200 through the second operation unit 330.

The temperature compensation unit 200 determines whether there is a difference between the reference value and the detection value detected by the second Hall sensor 117, and outputs the temperature compensation value for compensating for the variation corresponding to the difference. In the proportional integral control unit 230, the relationship of the deviation between the reference value and the output of the second Hall sensor 117 to a temperature compensation value is set by converting deviation in temperature into variation in position in consideration of the characteristic of variation in the intensity of magnetization of the sensor magnet 112 due to temperature. Furthermore, the reference value may be set to the output of the second Hall sensor 117 at a predetermined reference temperature.

As described above, the present invention is capable of inexpensively driving a dynamic aperture for adjusting the amount of light of the projection optical system in a projector or projection TV using a sensor magnet and a Hall sensor. Furthermore, it can be checked whether the characteristic of the sensor magnet has changed and how much the characteristic of the sensor magnet has changed due to ambient temperature, and precise position control results can be obtained by performing temperature compensation regardless of variation in ambient temperature.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dynamic aperture driving apparatus for adjusting the amount of light of a projection optical system by rotating a dynamic aperture, comprising:
    rotation means connected at the upper end thereof to the dynamic aperture to be rotated to the right and left within a range of rotating angles;
    driving means for rotating the rotation means to the right and left according to a predetermined electric signal;
    first detection means for detecting a position of the rotation means using a Hall effect; and
    second detection means for detecting an operational error of the first detection means due to variation in temperature.

2. The dynamic aperture driving apparatus as set forth in claim 1, wherein the first detection means comprises:
    a sensor magnet located parallel to a rotational path of the rotation means to provide a varying intensity of magnetization depending on a rotating angle of the rotation means based on linear variation in the intensity of magnetization along a length thereof; and
    a first Hall sensor rotated along with the rotation means to convert the intensity of magnetism, which is provided by the sensor magnet, into an electric signal.

3. The dynamic aperture driving apparatus as set forth in claim 1, wherein the first detection means comprises:
    a sensor magnet secured at a predetermined position so that an interval between the rotation means and the sensor magnet can be changed by rotation of the rotation means and adapted to have a constant intensity of magnetization; and
    a first Hall sensor rotated along with the rotation means to convert the intensity of magnetism of the sensor magnet, which changes depending on the rotating angle, into an electric signal.

4. The dynamic aperture driving apparatus as set forth in claim 2, wherein the second detection means is formed of a second Hall sensor that is fixed at a position spaced apart from the sensor magnet by a predetermined distance to detect variation in the intensity of magnetization of the sensor magnet.

5. The dynamic aperture driving apparatus as set forth in claim 1, further comprising:
    temperature compensation means for calculating variation in a characteristic of the first detection means due to variation in temperature from variation in an output of the second detection means and outputting a temperature compensation value for compensating for a position detection error of the first detection means; and
    a driving control means for compensating for the position detection error of the first detection means using the temperature compensation value, receiving an indicated position value, comparing the indicated position value with the corrected position detection value and controlling the driving means to cause the rotation means to reach an indicated position.

6. The dynamic aperture driving apparatus as set forth in claim 5, wherein the driving means comprises:
    a driving coil integrated with the rotation means to receive current controlled by the driving control means; and
    a driving magnet located to be spaced apart from the driving coil.

7. The dynamic aperture driving apparatus as set forth in claim 6, wherein the temperature compensation means comprises:
    a differential amplification unit for calculating deviation by comparing the output of the first detection means with a predetermined reference;
    a loop gain control unit for controlling a gain of the output signal of the differential amplification unit;
    a proportional integral control unit for calculating the temperature compensation value by performing a proportional integral control on the deviation provided through the loop gain control unit; and
    a voltage/current conversion unit for converting the temperature compensation value, which is provided by the proportional integral control unit, into a current signal.

8. The dynamic aperture driving apparatus as set forth in claim 6, wherein the driving control means comprises:
    a signal conversion unit for converting the position detection value, which is output from the first detection means, into a voltage signal;
    a first operation unit for calculating deviation by comparing the indicated position value with the position detection value that is applied by the signal conversion unit;
    a torque conversion unit for converting an output signal of the first operation unit into a torque control value;
    a second operation unit for adding the temperature compensation value of the temperature compensation means to a torque control value of the torque conversion unit and subtracting a current feedback value from a result of the addition;
    a current amplification unit for amplifying an output of the second operation unit;
    a H-type bridge for rectifying an output of the current amplification unit and applying the rectified output to the driving coil; and
    a current detection unit for feeding back current, which is applied to the driving coil, to the second operation unit.

9. The dynamic aperture driving apparatus as set forth in claim 7, wherein the reference value, which is applied to the differential amplification unit, is the output of the second detection means at predetermined reference temperature.

10. A method of controlling a dynamic aperture driving apparatus for detecting a rotational position using a sensor magnet adapted to provide a varying intensity of magnetism depending on a rotating angle of rotation means connected to a dynamic aperture, a first Hall sensor placed on the rotation means to convert the intensity of magnetism into an electric signal, and a second Hall sensor secured at a location spaced apart from the sensor magnet by a predetermined distance to detect variation in a magnetic force of the sensor magnet, the control method comprising the steps of:

storing the output of the second Hall sensor at a predetermined temperature before the dynamic aperture is driven, as a reference value;

receiving an indicated position value of the rotation means;

detecting a current position of the rotation means through the first Hall sensor;

calculating a temperature compensation value corresponding a deviation by comparing the output of the second Hall sensor with the reference value;

calculating a temperature-compensated position detection value by compensating for the position detection value, which is detected through the first Hall sensor, using the temperature compensation value; and    comparing the temperature-compensated position with the indicated position value and moving the rotation means to cause the dynamic aperture to reach the indicated position.

11. The control method as set forth in claim 10, wherein the step of moving the rotation means is the step of comparing the temperature-compensated position detection value with the indicated location value and driving the rotation means to allow the two values to be identical to each other.

12. The dynamic aperture driving apparatus as set forth in claim 3, wherein the second detection means is formed of a second Hall sensor that is fixed at a position spaced apart from the sensor magnet by a predetermined distance to detect variation in the intensity of magnetization of the sensor magnet.

\* \* \* \* \*